United States Patent
Asako et al.

(10) Patent No.: US 8,274,464 B2
(45) Date of Patent: Sep. 25, 2012

(54) ACTIVE MATRIX SUBSTRATE AND LIQUID CRYSTAL DISPLAY DEVICE

(75) Inventors: Isao Asako, Osaka (JP); Junichi Morinaga, Osaka (JP); Sunao Aoki, Osaka (JP); Kazunori Tanimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 259 days.

(21) Appl. No.: 12/744,654

(22) PCT Filed: Sep. 8, 2008

(86) PCT No.: PCT/JP2008/002470
§ 371 (c)(1),
(2), (4) Date: May 25, 2010

(87) PCT Pub. No.: WO2009/087705
PCT Pub. Date: Jul. 16, 2009

(65) Prior Publication Data
US 2010/0245223 A1    Sep. 30, 2010

(30) Foreign Application Priority Data
Jan. 10, 2008 (JP) .................. 2008-003236

(51) Int. Cl.
*G09G 3/36* (2006.01)
(52) U.S. Cl. .............. 345/92; 345/87; 345/100; 349/42
(58) Field of Classification Search ............ 345/87–100; 349/19, 41, 42, 54, 149
See application file for complete search history.

(56) References Cited

U.S. PATENT DOCUMENTS

| | | |
|---|---|---|
| 6,275,274 B1 | 8/2001 | Kanemori et al. |
| 6,614,498 B1 | 9/2003 | Tanaka et al. |
| 6,686,985 B1 | 2/2004 | Tanaka et al. |
| 2002/0057391 A1 | 5/2002 | Nakamura |
| 2007/0236647 A1 | 10/2007 | Konuma et al. |

FOREIGN PATENT DOCUMENTS

| | | |
|---|---|---|
| EP | 0 964 289 B1 | 8/2004 |
| JP | 3-212621 A | 9/1991 |
| JP | 4-184323 A | 7/1992 |
| JP | 5-80353 A | 4/1993 |
| JP | 8-240811 | 9/1996 |
| JP | 10-90718 A | 4/1998 |
| JP | 11-119254 A | 4/1999 |
| JP | 2000-194017 A | 7/2000 |
| JP | 2001-51286 A | 2/2001 |
| JP | 2001-154223 A | 6/2001 |
| JP | 2002-151699 A | 5/2002 |
| WO | WO 00/20918 A1 | 4/2000 |

OTHER PUBLICATIONS

Japanese Notice of Reasons for Rejections dated Jun. 5, 2012.

*Primary Examiner* — Kimnhung Nguyen
(74) *Attorney, Agent, or Firm* — Birch, Stewart, Kolasch & Birch, LLP (57) ABSTRACT

A plurality of source lines extending parallel to each other while alternately turning between a plurality of pixel electrodes provided in a delta arrangement, each have a plurality of first linear portions each extending along a side of the corresponding pixel electrode, a plurality of second linear portions each linked to the corresponding first linear portion and extending along a side of the corresponding pixel electrode to a middle portion of the side, and a plurality of protruding portions each extending from one end of the corresponding second linear portion along a side of the corresponding pixel electrode.

5 Claims, 8 Drawing Sheets

ACTIVE MATRIX SUBSTRATE AND LIQUID CRYSTAL DISPLAY DEVICE

TECHNICAL FIELD

The present invention relates to active matrix substrates and liquid crystal display devices.

BACKGROUND ART

By utilizing their small thickness and low power consumption, liquid crystal display devices have been conventionally widely used as displays for televisions, personal computers, mobile telephones, PDAs (Personal Digital Assistants), and the like.

Active matrix drive liquid crystal display devices include an active matrix substrate on which a plurality of pixel electrodes and a plurality of TFTs (Thin Film Transistors) are formed, a counter substrate which faces the active matrix substrate and on which a common electrode is formed, and a liquid crystal layer which is enclosed between the two substrates and inside a frame-like sealing member. Active matrix drive liquid crystal display devices have a display portion which includes a plurality of pixels and displays an image.

Figure 11:
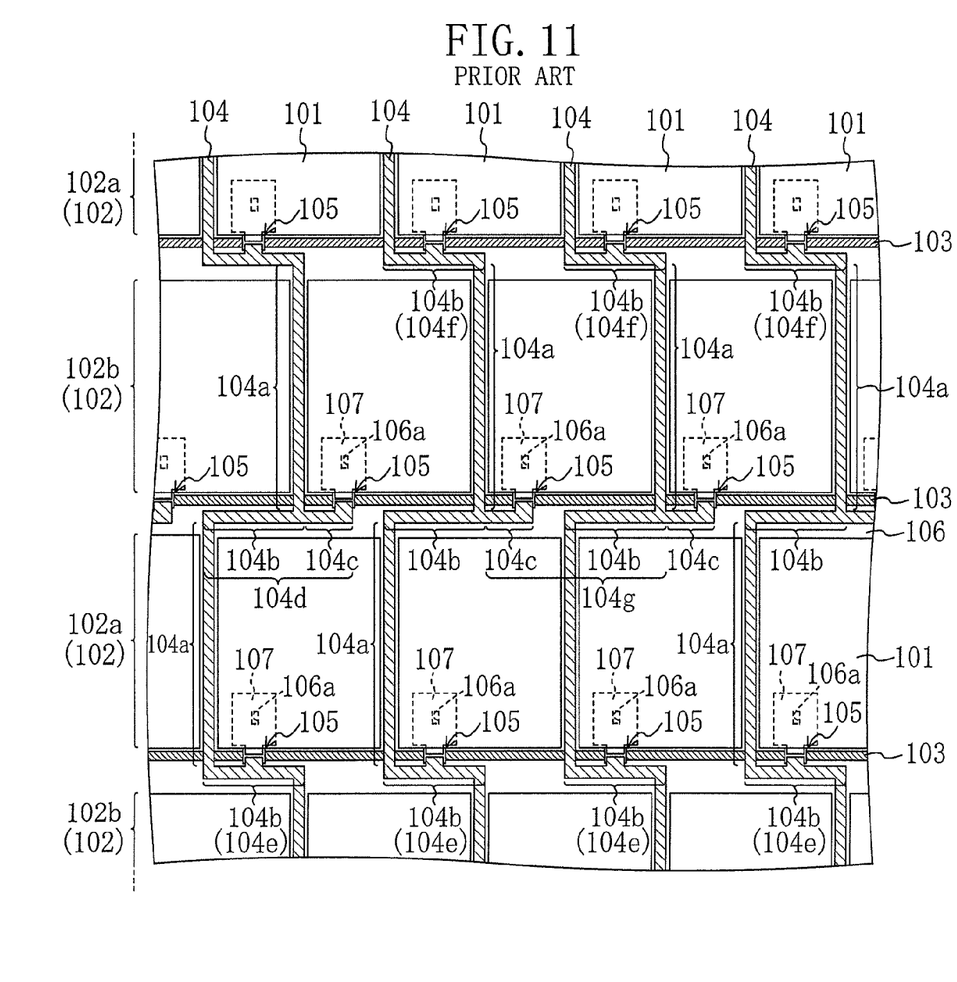
FIG. 11 is an enlarged plan view schematically showing a portion of a conventional active matrix substrate.

As an arrangement of pixels constituting the display portion, the delta arrangement, which is suitable for displaying of moving images, is known (see, for example, Patent Document 1). FIG. 11 is an enlarged plan view schematically showing a portion of a conventional active matrix substrate of a liquid crystal display device having a delta arrangement. Note that, in FIG. 11, and FIG. 12 described below, wires 103 and 104 and TFTs 105 are seen through an insulating film 106.

As shown in FIG. 11, on the active matrix substrate of a liquid crystal display device having a delta arrangement, pixel electrodes 101 constituting pixels are provided in a delta arrangement. The pixel electrodes 101 are arranged in lines which define a plurality of rows 102. The pixel electrodes 101 in adjacent rows 102a and 102b are offset by half a pitch from each other in the row direction (the horizontal direction in the figure). As used herein, the terms "horizontal," "vertical," "left," "right," "upper," "lower," "upward," and the like refer to the same directions as appearing in the accompanying drawings.

Moreover, a plurality of gate lines 103 extending parallel to the rows 102a and 102b, and a plurality of source lines 104 extending in a direction intersecting the gate lines 103 while alternately turning left and right, are each formed between the corresponding pixel electrodes 101.

TFTs 105 are connected to the respective pixel electrodes 101. The insulating film 106 is provided on the TFTs 105. Drain electrodes 107 of the TFTs 105 are connected to the respective pixel electrodes 101 via respective contact holes 106a formed in the insulating film 106. Each of the TFTs 105 is provided in the vicinity of an intersection portion of the corresponding gate line 103 and source line 104 for the purpose of increasing the aperture ratio of each pixel.

Each source line 104 has a plurality of first linear portions 104a extending along left sides of the respective pixel electrodes 101, and a plurality of second linear portions 104b linked to the respective first linear portions 104a and extending along upper and lower sides of the respective pixel electrodes 101 to middle portions of these sides. A protruding portion 104c extending along the upper or lower side of the corresponding pixel electrode 101 is provided at one end of every other second linear portion 104b of each source line 104. Each TFT 105 is alternately connected to the corresponding protruding portion 104c and to the corresponding second linear portion 104b along the corresponding source line 104. Thus, the active matrix substrate has a non-inverted structure in which the TFTs 105 connected to the respective pixel electrodes 101 are located at the same position in the respective pixel electrodes 101.

In delta-arrangement liquid crystal display devices having such a non-inverted structure, even if regions constituting pixels of the active matrix substrate and the counter substrate are offset from each other, the overlapping area between each color filter and the corresponding pixel electrode is the same for corresponding pixels on adjacent rows, and therefore, a horizontal stripe pattern or roughness is not likely to occur in displayed images.

CITATION LIST

Patent Document

PATENT DOCUMENT 1: Japanese Patent Laid-Open Publication No. H11-119254

SUMMARY OF THE INVENTION

Technical Problem

Incidentally, there is a parasitic capacitance between each pixel electrode and the corresponding source line. The parasitic capacitance increases as the distance between the pixel electrode and the source line decreases. The parasitic capacitance also increases as the length of the source line extending along the pixel electrode increases. The parasitic capacitance reduces a voltage applied between the pixel electrode and the common electrode to reduce the transmittance of the liquid crystal layer, depending on the magnitude thereof.

As shown in FIG. 11, in delta-arrangement liquid crystal display devices having the aforementioned non-inverted structure, for each source line 104 there is a difference in length between the portion 104d extending along the upper side of a pixel electrode 101 and the portion 104e extending along the lower side of the pixel electrode 101, in one row 102a of adjacent rows 102a and 102b, and there is a difference in length between the portion 104f extending along the upper edge side of a pixel electrode 101 and the portion 104g of the source line 104 extending along the lower side of the pixel electrode 101, in the other row 102b. Specifically, for each source line 104, the portion 104d extending along the upper side of the pixel electrode 101 on the one row 102a is longer than the portion 104e extending along the lower side of the pixel electrode 101 by an amount corresponding to the protruding portion 104c, and the portion 104g extending along the lower side of the pixel electrode 101 on the other row 102b is also longer than the portion 104f extending along the upper side of the pixel electrode 101 by an amount corresponding to the protruding portion 104c.

As shown in FIG. 11, the active matrix substrate is designed so that, when the pixel electrodes 101 and the source lines 104 are formed at predetermined positions so that the distance between each pixel electrode 101 and the corresponding source line 104 is the same between both sides in the vertical direction, the parasitic capacitance between each pixel electrode 101 and the corresponding source line 104 is the same.

Figure 12:
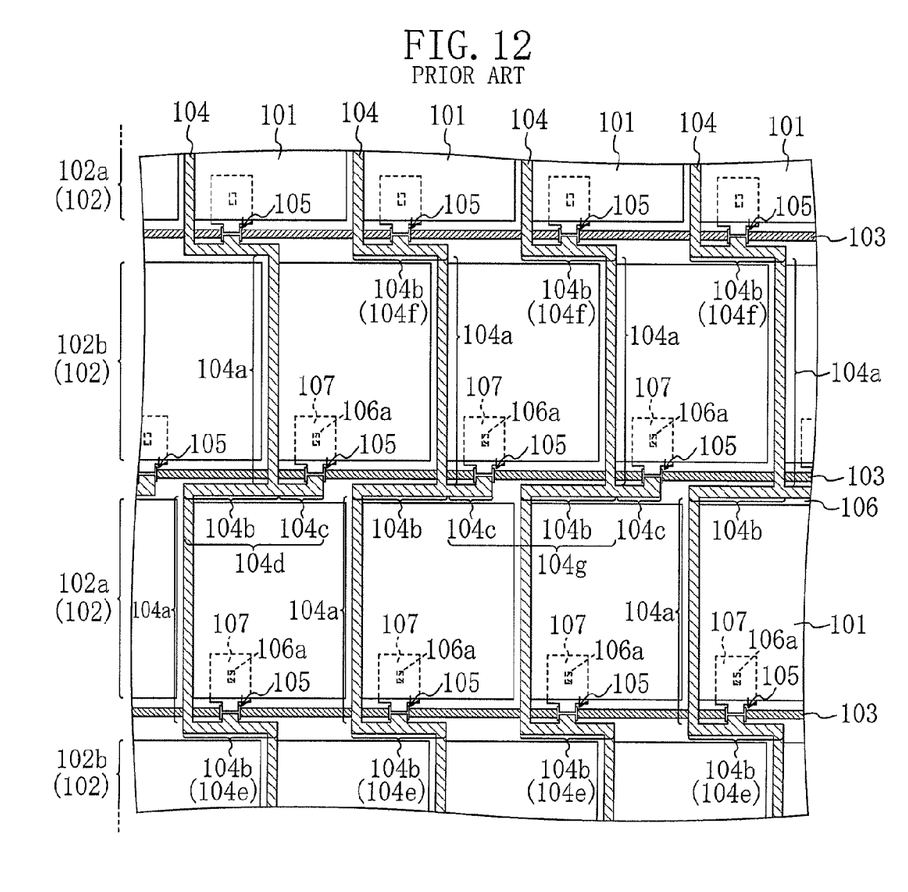
FIG. 12 is an enlarged plan view schematically showing a portion of a conventional active matrix substrate when pixel electrodes are formed and offset.

As shown in FIG. 12, however, when the formation positions of the pixel electrodes 101 with respect to each source line 104 are, for example, offset upward to the left, each pixel electrode 101 in one row 102a of adjacent rows 102a and 102b is located closer to the relatively long portion 104d of the source line 104, and is also located farther from the relatively short portion 104e of the source line 104. Moreover, each pixel electrode 101 in the other row 102b is located closer to the relatively short portion 104f of the source line 104 and is also located farther from the relatively long portion 104g of the source line 104. As a result, there is a difference between adjacent rows 102a and 102b in the parasitic capacitance between each pixel electrode 101 and the corresponding source line 104.

If there is thus a difference between adjacent rows in the parasitic capacitance between each pixel electrode and the corresponding source line, the transmittance of a pixel including each pixel electrode in one of the adjacent rows is lower than the transmittance of a pixel including each pixel electrode of the other row. As a result, a horizontal stripe pattern or roughness is likely to occur in displayed images, i.e., the display quality is reduced.

The present invention has been made in view of the aforementioned points. It is an object of the present invention to reduce or prevent a difference between adjacent rows of a plurality of pixel electrodes provided in a delta arrangement in the parasitic capacitance between each pixel electrode and the corresponding source line.

Solution to the Problem

To achieve the object of the present invention, a plurality of source lines which extend parallel to each other while alternately turning between a plurality of pixel electrodes provided in a delta arrangement, and each have a plurality of first linear portions each extending along a side of the corresponding pixel electrode, and a plurality of second linear portions each linked to the corresponding first linear portion and extending along a side of the corresponding pixel electrode to a middle portion of the side, each have a plurality of protruding portions each extending from one end of the corresponding second linear portion along a side of the corresponding pixel electrode.

Specifically, an active matrix substrate according to the present invention includes a plurality of pixel electrodes provided in a delta arrangement, a plurality of gate lines extending parallel to each other in a straight line, each provided between the corresponding pixel electrodes, a plurality of source lines extending parallel to each other in a direction intersecting the gate lines while alternately turning, each provided between the corresponding pixel electrodes, and a plurality of thin film transistors connected to the respective pixel electrodes. Each of the source lines has a plurality of first linear portions each extending along a side of the corresponding pixel electrode, a plurality of second linear portions each linked to the corresponding first linear portion and extending along a side of the corresponding pixel electrode to a middle portion of the side, and a plurality of protruding portions each extending from one end of the corresponding second linear portion along a side of the corresponding pixel electrode. Each of the thin film transistors is alternately connected to the corresponding first or second linear portion and to the corresponding protruding portion along the corresponding source line.

The protruding portions preferably have the same length.

Moreover, a liquid crystal display device according to the present invention includes the active matrix substrate, a counter substrate facing the active matrix substrate, and a liquid crystal layer provided between the active matrix substrate and the counter substrate.

—Operation—

Next, operation of the present invention will be described.

According to the active matrix substrate of the present invention, a plurality of source lines which extend parallel to each other while alternately turning between a plurality of pixel electrodes provided in a delta arrangement, and each have a plurality of first linear portions each extending along a side of the corresponding pixel electrode, and a plurality of second linear portions each linked to the corresponding first linear portion and extending along a side of the corresponding pixel electrode to a middle portion of the side, each have a plurality of protruding portions each extending from one end of the corresponding second linear portion along a side of the corresponding pixel electrode. Therefore, the difference in length between each of portions of each source line which extend along the corresponding pixel electrodes on both sides of the pixel electrodes in the direction of rows in which the pixel electrodes are arranged, can be reduced. As a result, even when the formation position of each pixel electrode is offset from the formation position of the corresponding source line, the difference between adjacent rows in the parasitic capacitance between each pixel electrode and the corresponding source line can be reduced or prevented.

In particular, when the protruding portions have the same length, in each source line the difference in length between each of portions which extend along the respective pixel electrodes on both sides of the respective pixel electrodes in the direction of the rows in which the pixel electrodes are arranged, is reduced or prevented. As a result, the difference between adjacent rows in the parasitic capacitance between each pixel electrode and the corresponding source line is reduced or prevented to the extent possible.

Moreover, the liquid crystal display device of the present invention includes the active matrix substrate, the counter substrate facing the active matrix substrate, and the liquid crystal layer provided between the two substrates. Therefore, even when the formation position of each pixel electrode is offset from the formation position of the corresponding source line, the difference between adjacent rows in the parasitic capacitance between each pixel electrode and the corresponding source line can be reduced or prevented. Moreover, the occurrence of a horizontal stripe pattern or roughness in displayed images can be reduced, i.e., the display quality can be improved.

Advantages of the Invention

According to the present invention, a plurality of source lines which extend parallel to each other while alternately turning between a plurality of pixel electrodes provided in a delta arrangement, and each have a plurality of first linear portions each extending along a side of the corresponding pixel electrode, and a plurality of second linear portions each linked to the corresponding first linear portion and extending along a side of the corresponding pixel electrode to a middle portion of the side, each have a plurality of protruding portions each extending from one end of the corresponding second linear portion along a side of the corresponding pixel electrode. Therefore, even when the formation position of each pixel electrode is offset from the formation position of the corresponding source line, the difference between adjacent rows in the parasitic capacitance between each pixel electrode and the corresponding source line can be reduced or prevented.

DESCRIPTION OF REFERENCE CHARACTERS (s) Liquid Crystal Display Device
(10) Active Matrix Substrate
(11) Pixel Electrode
(13) Gate Line
(14) Source Line
(14a) First Linear Portion
(14b) Second Linear Portion
(14c, 14d) Protruding Portion
(15) TFT (Thin Film Transistor)
(25) Counter Substrate
(30) Liquid Crystal Layer
(31) Sealing Member

DESCRIPTION OF EMBODIMENTS

Embodiments of the present invention will be described in detail hereinafter with reference to the accompanying drawings. Note that the present invention is not limited to the embodiments below.

First Embodiment of the Invention

Figure 1:
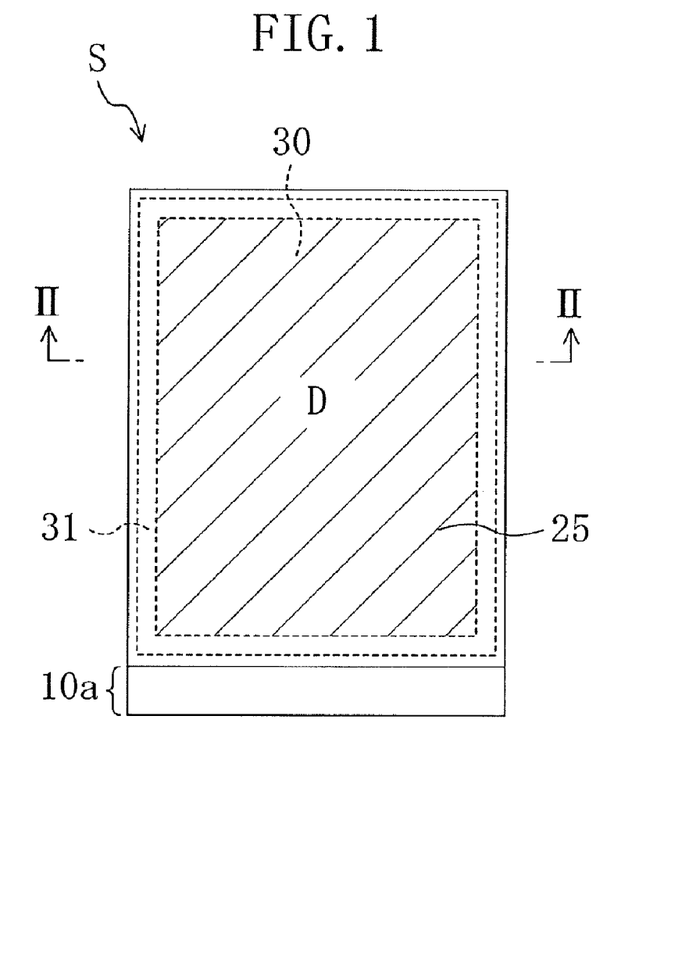
FIG. 1 is a plan view schematically showing a liquid crystal display device according to the first embodiment.
Figure 2:
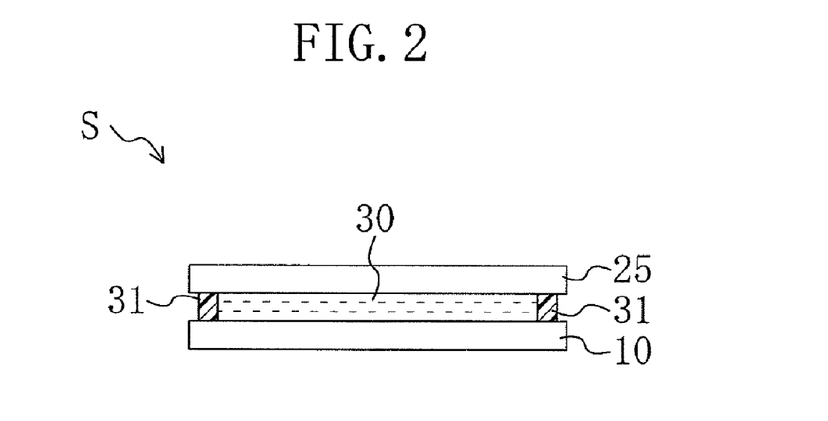
FIG. 2 is a schematic cross-sectional view taken along line II-II of FIG. 1.
Figure 3:
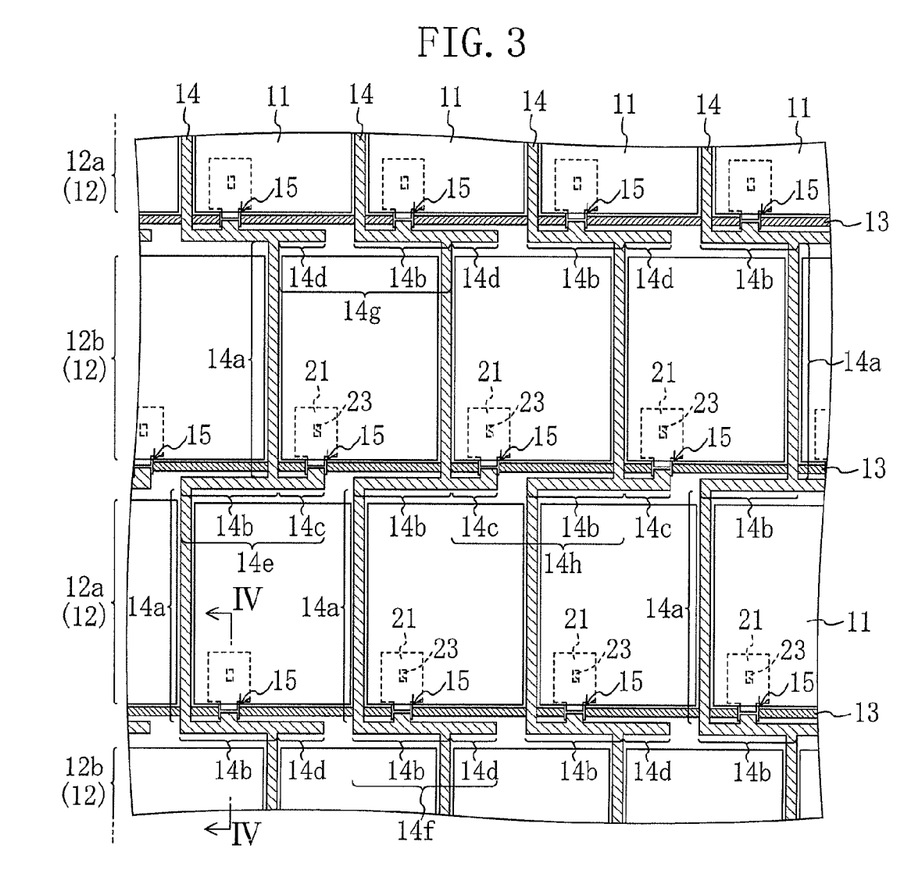
FIG. 3 is an enlarged view showing a portion of an active matrix substrate.
Figure 4:
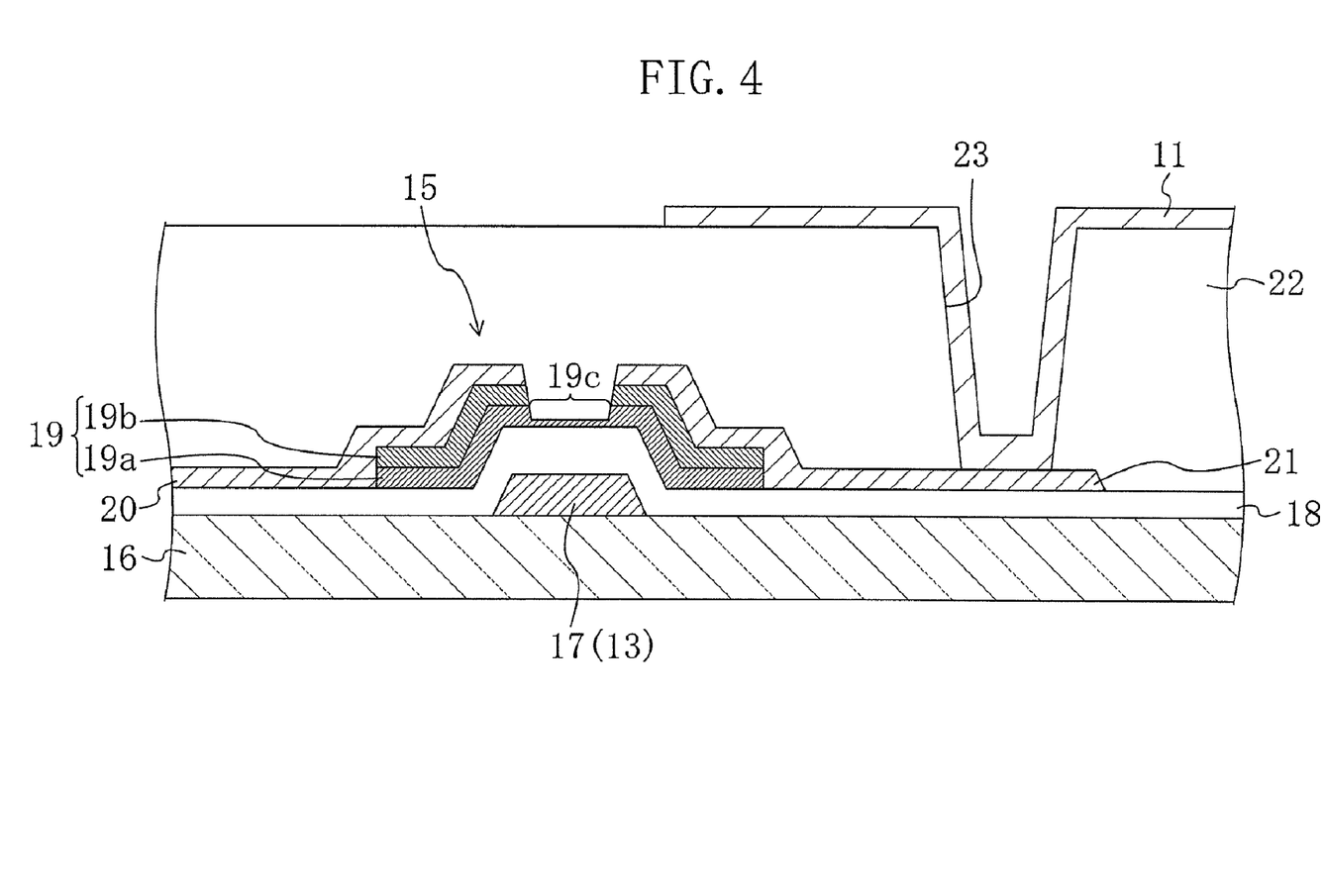
FIG. 4 is a cross-sectional view schematically showing a TFT, taken along line IV-IV of FIG. 3.
Figure 5:
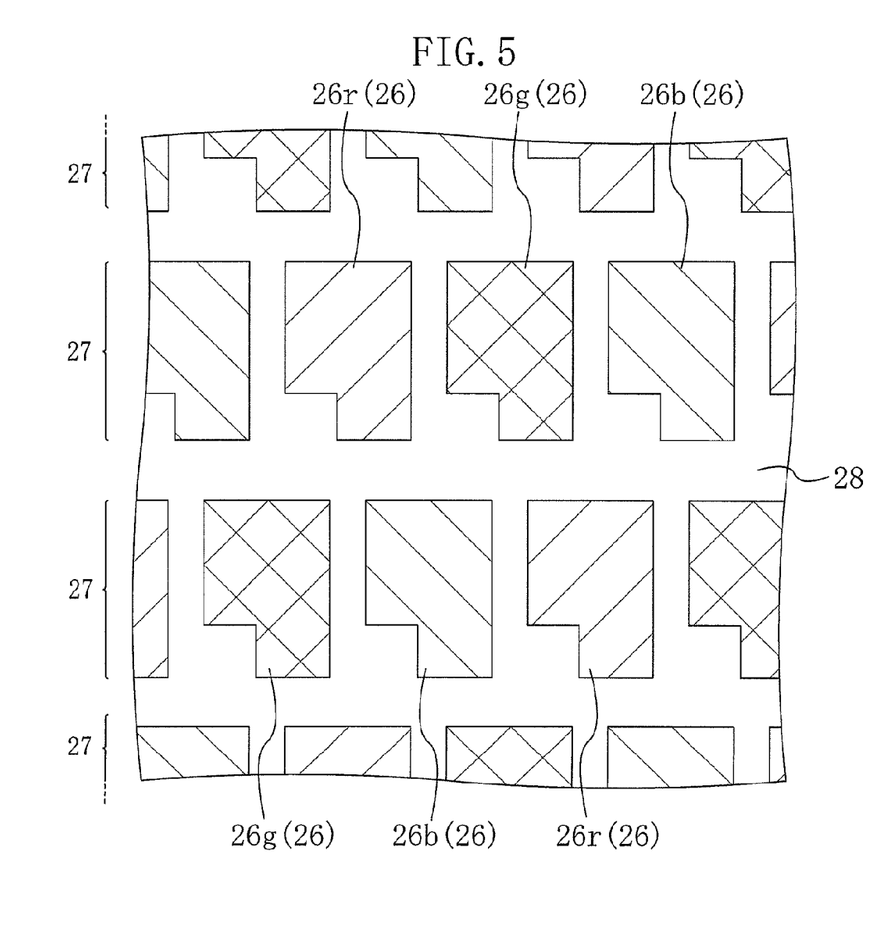
FIG. 5 is an enlarged view showing a portion of a counter substrate.

FIGS. 1-10 show a first embodiment of the present invention. FIG. 1 is a plan view schematically showing a liquid crystal display device S. FIG. 2 is a cross-sectional view schematically showing the liquid crystal display device S, taken along line II-II of FIG. 1. FIGS. 3 and 5 are enlarged views showing portions of a pair of substrates 10 and 25 constituting the liquid crystal display device S, respectively. FIG. 4 is a cross-sectional view schematically showing a thin film transistor 15, taken along line IV-IV of FIG. 3.

As shown in FIGS. 1 and 2, the liquid crystal display device S includes the active matrix substrate 10, the counter substrate 25 facing the active matrix substrate 10, and a liquid crystal layer 30 provided between the active matrix substrate 10 and the counter substrate 25. The liquid crystal display device S has a display portion D including a plurality of pixels (not shown) which are provided in a delta arrangement. Images are displayed in the display portion D.

The active matrix substrate 10 and the counter substrate 25 are each formed in the shape of, for example, a rectangle or the like. An alignment film is provided on a surface closer to the liquid crystal layer 30 of each of the active matrix substrate 10 and the counter substrate 25, and a polarizing plate is provided on a surface farther from the liquid crystal layer 30 of each of the active matrix substrate 10 and the counter substrate 25, although not shown. A frame-like sealing member 31 made of an epoxy resin or the like is provided between the active matrix substrate 10 and the counter substrate 25. A liquid crystal material is enclosed inside the sealing member 31 to form the liquid crystal layer 30.

As shown in FIG. 1, the active matrix substrate 10 has, as a mount region, a protruding portion 10a which protrudes on the outside of the counter substrate 25 at one side thereof and is exposed, i.e., is not covered with the counter substrate 25. An integrated circuit chip for driving liquid crystal, and a flexible printed wiring board for supplying power to the integrated circuit chip and supplying, for example, a signal for displaying an image from an external circuit to the active matrix substrate 10 and the counter substrate 25, are mounted on the protruding portion 10a, although not shown.

As shown in FIG. 3, the active matrix substrate 10 also includes, in the display portion D, a plurality of pixel electrodes 11 provided in a delta arrangement, a plurality of gate lines 13 each provided between the corresponding pixel electrodes 11 and extending parallel to each other, a plurality of source lines 14 each provided between the corresponding pixel electrodes 11 and extending in a direction perpendicular to the gate lines 13, and a plurality of thin film transistors (hereinafter referred to as TFTs) 15 connected to the respective pixel electrodes 11.

The pixel electrodes 11 provided in a delta arrangement define a plurality of rows 12 placed parallel to each other, where adjacent rows 12a and 12b are offset from each other by half a pitch in the row direction (the horizontal direction). Each pixel electrode 11 is formed in the shape of, for example, a rectangle. The active matrix substrate 10 has a non-inverted structure in which the TFTs 15 are located at the same position with respect to the respective pixel electrodes 11.

Although it is assumed in this embodiment that the pixel electrodes 11 are formed in the shape of a rectangle, the pixel electrodes 11 may be formed in various shapes of, for example, a rectangle a portion of which is cut away, a rectangle a portion of which protrudes, and the like.

The gate lines 13 each extend in a straight line in the row direction between the corresponding pixel electrodes 11. Moreover, auxiliary capacitance lines (not shown) are each provided between the corresponding gate lines 13, extending along the gate lines 13 and overlapping drain electrodes 21 described below of the TFTs 15 on the corresponding row. The source lines 14 are each provided between the corresponding pixel electrodes 11, extending parallel to each other in a direction intersecting the gate lines 13 while alternately turning to the left and right, i.e., meandering in a zigzag (squarewave pattern).

Each source line 14 has a plurality of first linear portions 14a which extend along left sides of the corresponding pixel electrodes 11, and a plurality of second linear portions 14b which are linked to the respective first linear portions 14a and extend along upper and lower sides of the corresponding pixel electrodes 11 to middle portions of these sides. Each source line 14 is provided by alternately linking the first linear portions 14a and the second linear portions 14b.

Each source line 14 also has a plurality of protruding portions 14c and 14d which extend from the right ends of the respective second linear portions 14b along the upper and lower sides of the respective pixel electrodes 11. The protruding portions 14c and 14d have the same length.

Each source line 14 is connected to the corresponding pixel electrodes 11 provided on the right side of the source line 14, via the corresponding TFTs 15. Each TFT 15 is alternately connected to the corresponding second linear portion 14b and to the corresponding protruding portion 14c along the corresponding source line 14.

Each TFT 15 is provided in the vicinity of an intersection between the corresponding gate line 13 and the corresponding source line 14 so that the aperture ratio of a pixel is improved. As shown in FIG. 4, the TFTs 15 are of the bottom gate type. Each TFT 15 has a semiconductor layer 19 which is formed on a gate insulating film 18 which is provided to cover the corresponding gate line 13 and the corresponding auxiliary capacitance line. The source lines 14 are also formed on the gate insulating film 18.

Each semiconductor layer 19 formed on the gate insulating film 18 has an island-like structure extending across a portion of the corresponding gate line 13. A portion of each gate line 13 overlapping the corresponding semiconductor layer 19 with the gate insulating film 18 being interposed therebetween forms a gate electrode 17 of the corresponding TFT 15.

Each semiconductor layer 19 is, for example, a multilayer of an intrinsic amorphous silicon layer 19a and an n+ amorphous silicon layer 19b. The n+ amorphous silicon layer 19b is divided into two by removing a portion thereof from a region where the n+ amorphous silicon layer 19b overlaps the gate electrode 17. A region of the intrinsic amorphous silicon layer 19a which is exposed through the n+ amorphous silicon layer 19b forms a channel portion 19c.

A source electrode 20 connected to the source line 14 is formed on one of the n+ amorphous silicon layers 19b and the gate insulating film 18. A drain electrode 21 connected to the pixel electrode 11 is formed on the other n+ amorphous silicon layer 19b and the gate insulating film 18.

Although it is assumed in this embodiment that the TFTs 15 are of the bottom gate type, the TFTs 15 may be of the top gate type.

A multilayer insulating film 22 in which a silicon nitride film and an acrylic resin film (both not shown) are successively stacked is formed on the TFTs 15. The pixel electrodes 11 are formed on a surface of the multilayer insulating film 22. A plurality of contact holes 23 each of which exposes a portion of the drain electrode 21 of the corresponding TFT 15 at a bottom thereof are formed in the multilayer insulating film 22. The drain electrodes 21 are connected to the respective pixel electrodes 11 via the respective contact holes 23.

As shown in FIG. 5, a plurality of color filters 26 are provided to overlap the respective pixel electrodes 11, on the display portion D of the counter substrate 25. The color filters 26 include color filters of three colors, e.g., red color filters 26r, green color filters 26g, and blue color filters 26b. The color filters 26 define a plurality of rows 27 as with the pixel electrodes 11.

Specifically, the red, green, and blue color filters 26r, 26g, and 26b are periodically arranged in lines extending in the row direction. The color filters 26 on one row are offset from the respective color filters 26 of the same color on the next row by 1.5 pitches in the row direction.

A black matrix 28 is also formed on the counter substrate 25 to separate the color filters 26 from each other. Moreover, a common electrode (not shown) is formed to cover the color filters 26 and the black matrix 28.

In the liquid crystal display device S thus configured, by successively turning on specified TFTs 15 connected to the respective corresponding gate lines 13 in accordance with a predetermined gate signal input from an external circuit and supplying a predetermined source signal to the corresponding source lines 14, predetermined charge is written via the corresponding drain electrodes 21 to the corresponding pixel electrodes 11 so that a predetermined voltage is applied to the liquid crystal layer 30 between the corresponding pixel electrodes 11 and the common electrode. As a result, the alignment of liquid crystal molecules is controlled so that a predetermined image is displayed.

—Fabrication Method—

Next, a method for fabricating the active matrix substrate 10 and a method for fabricating the liquid crystal display device S will be described.

The liquid crystal display device S is fabricated as follows: the active matrix substrate 10 and the counter substrate 25 are separately fabricated before being joined together via the sealing member 31; the liquid crystal layer 30 is enclosed between the active matrix substrate 10 and the counter substrate 25 by the sealing member 31; an integrated circuit chip and a flexible printed wiring board are mounted onto the active matrix substrate 10; and a polarizing plate is attached to each of the substrates 10 and 25. The liquid crystal display device S of the present invention is particularly characterized by the active matrix substrate 10. Therefore, the method for fabricating the active matrix substrate 10 will be described in detail hereinafter with reference to FIGS. 6-10. FIGS. 6-10 are diagrams for describing the method for fabricating the active matrix substrate 10, schematically showing enlarged cross-sectional views of a region of a glass substrate 16 on which the TFTs 15 are formed.

Figure 6:
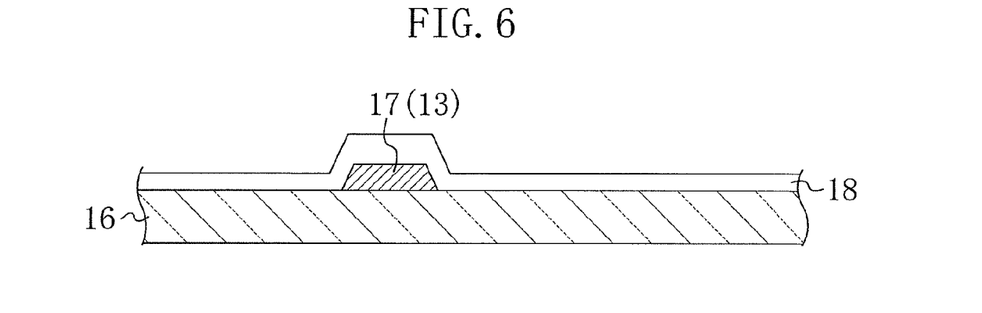
FIG. 6 is a cross-sectional view schematically showing a glass substrate on which a gate line and a gate insulating film are formed.

The active matrix substrate 10 is fabricated as follows. Initially, a metal film containing, for example, aluminum (e.g., about 50-500 nm thick) is formed on an entire surface of the glass substrate 16 by sputtering. Thereafter, the metal film is patterned by photolithography to form the gate lines 13 (the gate electrodes 17) and the auxiliary capacitance lines as shown in FIG. 6.

Next, a silicon nitride film (e.g., about 100-500 nm thick) and the like are formed on an entirety of the surface on which the gate lines 13 (the gate electrodes 17) and the auxiliary capacitance lines are formed, by plasma CVD (Chemical Vapor Deposition), to form the gate insulating film 18.

Figure 7:
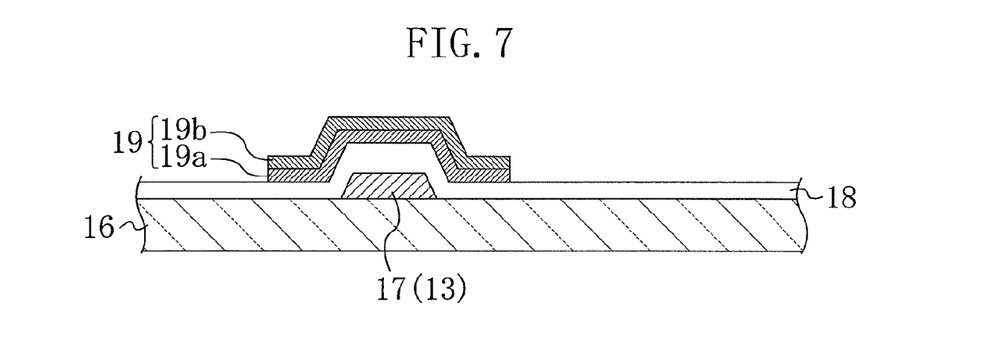
FIG. 7 is a cross-sectional view schematically showing the glass substrate on which a semiconductor layer is formed.

Next, an intrinsic amorphous silicon film (e.g., about 50-100 nm thick), and an n+ amorphous silicon film (e.g., about 50-100 nm thick) doped with an n-type impurity element, such as phosphorus or the like, are successively formed on an entire surface of the gate insulating film 18 by a plasma CVD method. Thereafter, the intrinsic amorphous silicon film and the n+ amorphous silicon film are patterned into island-like structures on the gate electrode 17 by photolithography, to form the semiconductor layers 19 as shown in FIG. 7.

Here, the semiconductor layer 19 may be formed of an amorphous silicon film as described above, or alternatively, may be formed of a polysilicon film. Moreover, the amorphous silicon film or the polysilicon film may be subjected to a laser annealing treatment to improve the crystallinity.

Figure 8:
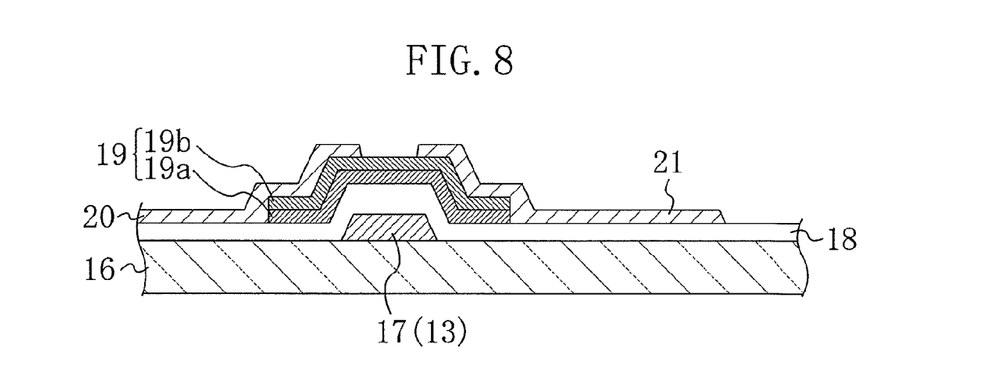
FIG. 8 is a cross-sectional view schematically showing the glass substrate on which a source electrode and a drain electrode are formed.

Next, a metal film containing, for example, aluminum (e.g., about 50-500 nm thick) is formed, by sputtering, on an entire surface of the gate insulating film 18 on which the semiconductor layers 19 are formed. Thereafter, the metal film is patterned by photolithography to form the source electrodes 20 and the drain electrodes 21 as shown in FIG. 8, and also form the source lines 14. In this case, the first linear portions 14a and the second linear portion 14b, and the protruding portions 14c and 14d are also formed.

Figure 9:
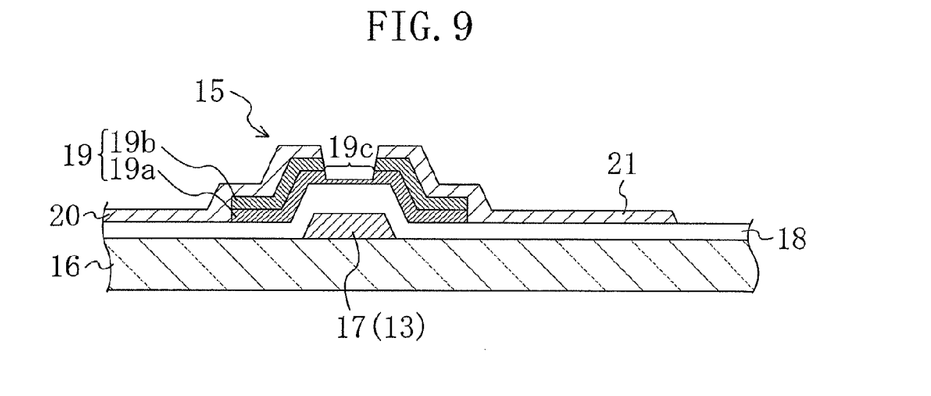
FIG. 9 is a cross-sectional view schematically showing the glass substrate on which a channel portion is formed in the semiconductor layer.

Next, a portion of the n+ amorphous silicon layer 19b of each the semiconductor layer 19 is removed by etching using the corresponding source electrode 20 and drain electrode 21 as a mask, to form the corresponding channel portion 19c as shown in FIG. 9. Thus, the TFTs 15 are formed.

Next, a silicon nitride film (e.g., about 100-300 nm thick) and the like are formed by a plasma CVD method to cover the TFTs 15. Thereafter, an acrylic resin film (e.g., about 1000-5000 nm thick) and the like are formed by a spin coating method to form the multilayer insulating film 22.

Figure 10:
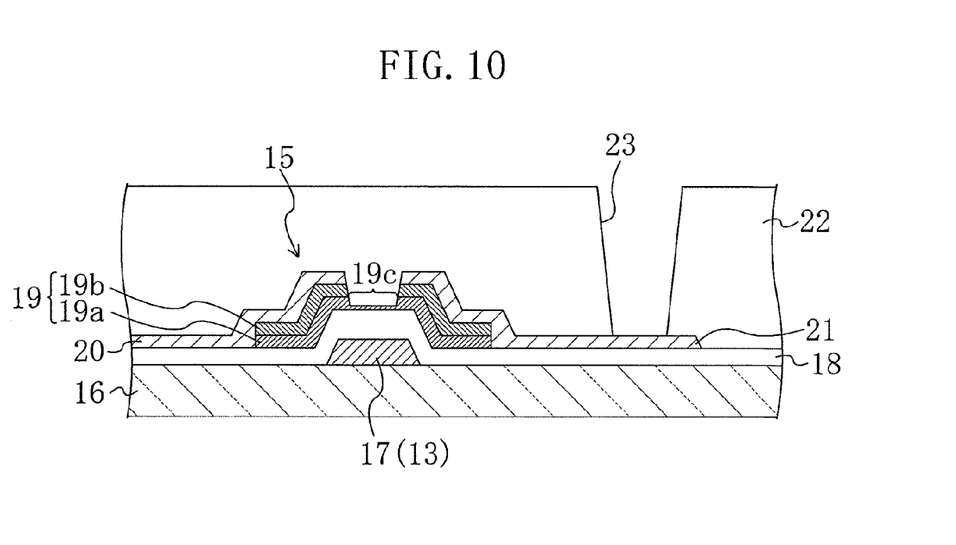
FIG. 10 is a cross-sectional view schematically showing the glass substrate on which a contact hole is formed in a multilayer insulating film.

Next, a portion of each of regions of the multilayer insulating film 22 which overlap the respective drain electrodes 21 is removed by etching to form the contact holes 23 as shown in FIG. 10. Thereafter, a transparent conductive film (e.g., about 100-200 nm thick) made of ITO (Indium Tin Oxide) or the like is formed, by sputtering, on an entire surface of the multilayer insulating film 22 in which the contact holes 23 are formed. Thereafter, the transparent conductive film is patterned by photolithography to form the pixel electrodes 11.

Thereafter, a polyimide-based resin is applied by a printing method to cover the pixel electrodes 11 and thereafter a rubbing treatment is performed to form an alignment film. The active matrix substrate 10 having a non-inverted structure is thus fabricated.

—Advantages of First Embodiment—

Therefore, according to the first embodiment, the source lines 14 extend while alternately turning between the pixel electrodes 11 provided in a delta arrangement. Each source line 14 has a plurality of first linear portions 14a each extending along a side of the corresponding pixel electrode 11, and a plurality of second linear portions 14b each linked to the corresponding first linear portion 14 and extending along a side of the corresponding pixel electrode 11 to a middle portion of the side. Each source line 14 also has a plurality of protruding portions 14c and 14d each extending from one end of the corresponding second linear portion 14b along a side of the corresponding pixel electrode 11. Therefore, as shown in FIG. 3, a difference between each of portions 14e, 14f, 14g, and 14h of each source line 14 which extend along the respective pixel electrodes 11 on both sides of the respective pixel electrodes 11 in the direction of the rows 12 in which the pixel electrodes 11 are arranged, can be reduced. As a result, even when the formation position of each pixel electrode 11 is offset from the formation position of the corresponding source line 14, the difference between adjacent rows 12a and 12b in the parasitic capacitance between each pixel electrode 11 and the corresponding source line 14 can be reduced or prevented. Therefore, the occurrence of a horizontal stripe pattern or roughness in displayed images can be reduced, i.e., the display quality can be improved.

Moreover, the protruding portions 14c and 14d have the same length. Therefore, in each source line 14, the difference in length between each of the portions 14e, 14f, 14g, and 14h which extend along the respective pixel electrodes 11 on both sides of the respective pixel electrodes 11 in the direction of the rows 12 in which the pixel electrodes 11 are arranged, can be reduced or prevented. As a result, the difference between adjacent rows 12a and 12b in the parasitic capacitance between each pixel electrode 11 and the corresponding source line 14 can be reduced or prevented to the extent possible.

Other Embodiments

Although it has been assumed in the first embodiment that the protruding portions 14c and 14d have the same length, the present invention is not limited to this. The protruding portions 14c and 14d may have different lengths. Even when the protruding portions 14c and 14d thus have different lengths, in each source line 14 the difference in length between each of the portions 14e, 14f, 14g, and 14h which extend along the respective pixel electrodes 11 on both sides of the respective pixel electrodes 11 in the direction of the rows 12 in which the pixel electrodes 11 are arranged, can be reduced or prevented. As a result, the difference between adjacent rows 12a and 12b in the parasitic capacitance between each pixel electrode 11 and the corresponding source line 14 can be reduced.

Although it has been assumed in the first embodiment that each TFT 15 is alternately connected to the corresponding second linear portion 14b and to the corresponding protruding portion 14c, the present invention is not limited to this. Each TFT 15 may be alternately connected to the corresponding first linear portion 14a and to the corresponding protruding portion 14c.

Although the liquid crystal display device S having the active matrix substrate 10 has been described in the first embodiment, the present invention is not limited to this. The present invention may be applicable to other display devices having an active matrix substrate, such as organic electroluminescent display devices and the like.

In the first embodiment, the gate lines 13 each extend in a straight line between the corresponding pixel electrodes 11, and the source lines 14 each extend between the corresponding pixel electrodes 11 while alternately turning. Alternatively, the source lines may each extend in a straight line between the corresponding pixel electrodes, and the gate lines may each extend between the corresponding pixel electrodes in a direction intersecting the source lines while alternately turning. Specifically, each gate line may have a plurality of first linear portions each extending along a side of the corresponding pixel electrode, a plurality of second linear portions each linked to the corresponding first linear portion and extending along a side of the corresponding pixel electrode to a middle portion of the side, and a plurality of protruding portions each extending from one end of the corresponding second linear portion along a side of the corresponding pixel electrode.

According to the aforementioned structure, even when the formation position of each pixel electrode is offset from the formation position of the corresponding source line, the difference in length between each of portions of each gate line which extend along the corresponding pixel electrodes on both sides of the pixel electrodes in the direction of the rows in which the pixel electrodes are arranged, can be reduced. Therefore, the difference between adjacent rows in the parasitic capacitance between each pixel electrode and the corresponding gate line can be reduced or prevented.

INDUSTRIAL APPLICABILITY

As described above, the present invention is useful for active matrix substrates and liquid crystal display devices. In particular, the present invention is suitable to an active matrix substrate and a liquid crystal display device which are desired to reduce the difference between adjacent rows of a plurality of pixel electrodes provided in a delta arrangement, in the parasitic capacitance between each pixel electrode and the corresponding source line.

The invention claimed is:

1. An active matrix substrate comprising:
a plurality of pixel electrodes provided in a delta arrangement;
a plurality of gate lines extending parallel to each other in a straight line, each provided between the corresponding pixel electrodes;
a plurality of source lines extending parallel to each other in a direction intersecting the gate lines while alternately turning, each provided between the corresponding pixel electrodes; and
a plurality of thin film transistors connected to the respective pixel electrodes, wherein
each of the source lines has a plurality of first linear portions each extending in the direction intersecting the gate lines, and arranged along the direction intersecting the gate lines to be alternately offset from each other in a direction in which the gate lines extend, a plurality of second linear portions each extending along the gate lines and linking ends of adjoining ones of the first linear portions to each other, each of the plurality of second linear portions respectively including a protruding portion each extending from one end of the corresponding one of the second linear portions along the gate lines, the protruding portions being oriented in a same direction, and
each of the thin film transistors is alternately connected to the corresponding first or second linear portion and to the corresponding protruding portion along the corresponding source line.

2. The active matrix substrate of claim 1, wherein the protruding portions have the same length.

3. A liquid crystal display device comprising:
the active matrix substrate of claim 1;
a counter substrate facing the active matrix substrate; and
a liquid crystal layer provided between the active matrix substrate and the counter substrate.

4. The active matrix substrate of claim 1, wherein each of the thin film transistors is provided in the side to the one direction with respect to the first linear portions of the source line to which the thin film transistor is connected, and arranged in a predetermined position with respect to the corresponding pixel electrode to which the thin film transistor is connected.

5. The active matrix substrate of claim 1, wherein a combined length of the protruding portion and the corresponding second linear portion along one side of the corresponding pixel electrode is the same as the combined length of the protruding portion and the corresponding linear portion along an opposite side of the corresponding pixel electrode.

* * * * *